W. V. ROBERTSON.
WORK SUPPORT.
APPLICATION FILED MAY 2, 1912.
1,131,736.
Patented Mar. 16, 1915.
Fig. 1.
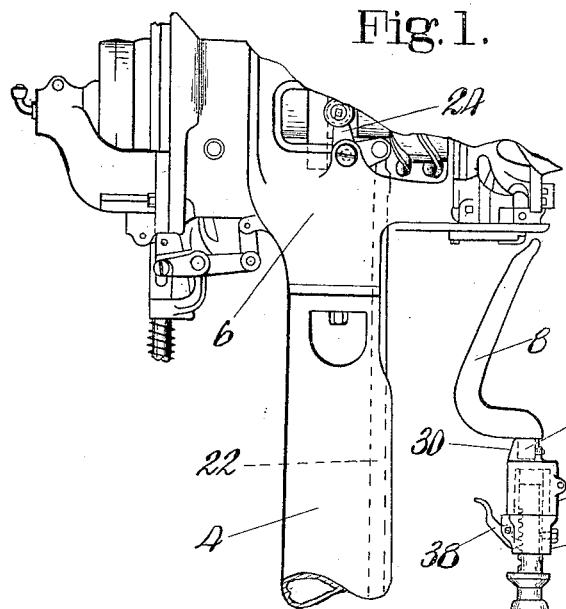
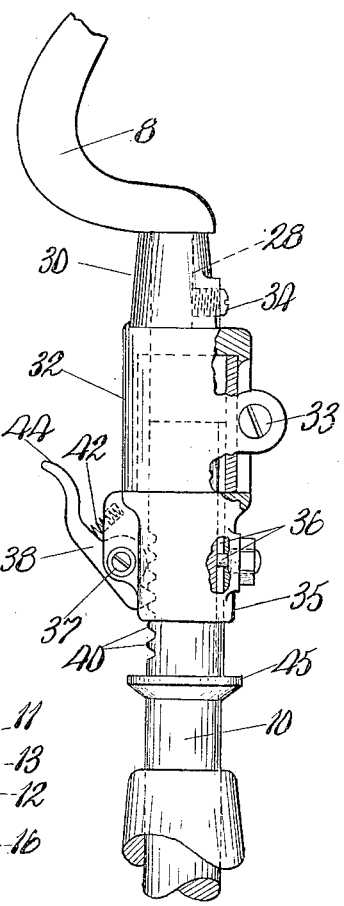
Fig. 2.
WITNESSES.
Elizabeth C. Coupe
O. Blanche Hargraves
INVENTOR.
William V. Robertson
By his Attorney
Nelson W. Howard

UNITED STATES PATENT OFFICE.

WILLIAM V. ROBERTSON, OF NEW YORK, N. Y., ASSIGNOR TO UNITED SHOE MACHINERY COMPANY, OF PATERSON, NEW JERSEY, A CORPORATION OF NEW JERSEY.

WORK-SUPPORT.

1,131,736.     Specification of Letters Patent.     Patented Mar. 16, 1915.

Application filed May 2, 1912. Serial No. 694,722.

*To all whom it may concern:*

Be it known that I, WILLIAM V. ROBERTSON, a citizen of the United States, residing at New York, in the county of New York and State of New York, have invented certain Improvements in Work-Supports, of which the following description, in connection with the accompanying drawings, is a specification, like reference characters on the drawings indicating like parts in the several figures.

This invention relates to work supports which are especially adapted for use in the manufacture of boots and shoes, the invention being herein shown as embodied in a machine for successively inserting fastenings.

Although the invention is particularly useful in machines for successively inserting fastenings, such as are used in the manufacture of boots and shoes, and especially in those machines which embody what are commonly termed "horn release" mechanisms, it will be understood that in certain of its aspects the invention is of general utility in the art to which it relates.

Substantially all machines for successively inserting fastenings in boots and shoes which are in use at the present time and which operate upon a boot or shoe supported upon a work support have provision for releasing the clamping pressure upon the work between the successive fastening inserting operations in order to permit the work to be fed freely along into position to receive the next fastening. Mechanisms for effecting such release of the work from the clamping pressure are well-known and of various constructions, the majority of these mechanisms having provision for automatic adjustment to varying thicknesses of the work whereby the amount of release will be substantially uniform at all times.

Inasmuch as the variations in a single piece of work are not usually very marked, the range of automatic adjustment is preferably comparatively limited in order to avoid unnecessary vibration in the machine and also to permit increased speed of operation of the machine. Provision is, however, usually, made for an initial adjustment of the work support so that when work having an average thickness which varies considerably from the average thickness of the work upon which the machine has previously been operating is to be operated upon, the work support may be so adjusted that the full benefit of the automatic adjustment may be obtained for the particular work to be operated upon, particularly when the work support is returned to and held in clamping position by a comparatively strong spring.

Such adjustment of the work support has usually been effected up to the present time by unclamping the work support from its shaft or carrier and moving the work and work support into the desired initial position and then again clamping the work support to its carrier. This mode of initial adjustment takes considerable time but has been tolerated hitherto because in most factories the change from one class of work to another takes place only infrequently and therefore the initial adjustment has been required only occasionally. When, however, the class of work to be operated upon changes frequently as it does in many factories at the present time, considerable time is wasted in effecting the initial adjustment by unclamping and again clamping the work support to its carrier.

An object of the present invention is to provide improved means for obtaining the initial positioning of the horn or other work support with relation to the head of the machine to insure the proper clamping of the material to be operated upon and to insure the best operation of the automatic releasing mechanism.

A particular object of the invention is to provide improved means for securing the work support in the desired initial position which will operate automatically to prevent the movement of the work support away from its operative work supporting position but will permit free movement of the work support toward its operative supporting position.

Other features of the invention will be apparent when the following description and claims are considered in connection with the accompanying drawings, in which—

Figure 1 is a side elevation of portions of a fastening inserting machine embodying the present invention; Fig. 2 is an enlarged side elevation of a portion of the horn and shaft.

For convenience in describing it the invention is shown as applied to a machine for inserting fastenings embodying a horn and horn release mechanism such as shown and described in United States Letters Patent No. 1,031,438, granted July 2, 1912.

The machine comprises a base 2, a column 4, a head 6 in which the fastening inserting mechanism is carried and a work support which may be of any suitable or desired construction. As herein shown said work support comprises a horn 8 mounted upon the upper end of a horn shaft 10, the latter being mounted to slide vertically in the frame of the machine. This horn shaft 10 is connected at its lower end to a toggle link 11 the lower end of which is jointed at 13 to a coöperating link 12 in turn jointed to the upper end of a toggle supporting rod 14, mounted to slide vertically in the frame 2. Surrounding the toggle rod 14 and acting against a slide 16 which has mounted thereon the automatic measuring mechanism, not herein shown, but fully shown and described in the patent above identified, whereby the amount of release of the support is substantially uniform at all times, is a lifting spring 18 that tends normally to lift said work support and work thereon to the machine. The toggle 11, 12, is adapted to be straightened and broken at each rotation of the main shaft by mechanism comprising a link 20 connected to the central pivot 13 of the toggle 11—12 at one end, and at its other end connected to one arm of a bell crank 21. The other arm of the bell crank is provided with a slot in which is adjustably confined a bolt connecting the lower end of a rod 22 with the bell crank 21, the upper end of said rod being connected with one arm of a second bell crank 24. The other arm of the bell crank 24 is acted upon by a cam on the main shaft of the machine which operates in the usual manner to break the toggle to depress the horn periodically between the driving of successive fastenings and together with the measuring mechanism which acts in conjunction with the toggle mechanism are more fully shown and described in said patent. A treadle lever 26 fulcrumed at 27 in the base 2 of the machine acts on the lower end of the toggle supporting rod 14 against the tension of the spring 18 to lower the work support.

The horn 8 upon which the work to be operated upon is supported is provided with a shank 28 which has a bearing in an upwardly extending offset portion 30 of a split sleeve 32 mounted to slide freely and also to rotate on the upper portion of the horn shaft 10, a split bushing in the sleeve providing for a firm bearing of the sleeve on the shaft. The horn is capable of movement into different positions of lateral adjustment by reason of its eccentric mounting in the sleeve, and may be temporarily locked in any position of adjustment by the screw bolt 33 and a set screw 34 which prevents the rotation of the horn in the bearing 30 and on the horn shaft 10.

A sleeve 35 on the shaft 10 provides a support for the horn and for sleeve 32. The sleeve 35 is movable longitudinally on the shaft and is prevented from rotation on the shaft by the key and key way 36. Pivoted at 37 upon the sleeve 35 is a locking pawl 38 arranged to coöperate with ratchet teeth 40 on a side of the horn shaft 10, said pawl bearing upon a spring 42 in a socket in the sleeve 35 which tends to maintain the pawl normally in contact with the teeth on the shaft. An extended portion 44 of the pawl 38 provides a handle by which the pawl may be moved from out of engagement with the teeth on the shaft to permit the horn to be lowered on the shaft. A flange 45 on the shaft determines the total downward movement of the horn.

From the construction described it will be noted that the pawl allows the horn to be moved by an operator quickly into the proper initial position so that it will properly clamp against the work plate the various thickness of material which the particular piece of work presents and when that position has been reached automatically locks the horn against downward movement.

Having thus described the invention, what is claimed as new and desired to be secured by Letters Patent of the United States is:—

1. In a machine of the class described, the combination with a work support comprising a horn shaft and horn, means for causing the work support to clamp the work, and means for intermittently releasing the clamping pressure of said support to permit the work to be fed thereover, of adjustable connections between said horn and said horn shaft to provide an initial vertical adjustment of the horn upon the horn shaft, said connections comprising a pawl movable with the horn and a ratchet upon said shaft extending along the path of movement of said pawl, the construction being such that the horn is automatically locked against movement away from its operative work supporting position but is permitted free movement toward its operative position.

2. In a machine of the class described, the combination with a work support comprising a horn shaft and horn, means for causing the work support to clamp the work and means for intermittently releasing the clamping pressure of said support to permit the work to be fed thereover, of adjustable connections between said horn and horn shaft to provide an initial vertical adjustment of the horn upon the horn shaft, said connections comprising a ratchet upon said shaft and a pawl spring-pressed normally into engagement with said ratchet to lock said horn automatically against downward movement, and a handle on the pawl to release said pawl from engagement with the ratchet when it is desired to lower the horn to accommodate a thickness of material which requires a clamping pressure outside the range provided by the automatic adjustment of the horn.

In testimony whereof I have signed my name to this specification in the presence of two subscribing witnesses.

WILLIAM V. ROBERTSON.

Witnesses:
 GEO. F. WOLPE,
 EDWARD W. GILBERT.

Copies of this patent may be obtained for five cents each, by addressing the "Commissioner of Patents, Washington, D. C."